United States Patent Office 2,921,935
Patented Jan. 19, 1960

2,921,935
THIAMORPHOLINE DERIVATIVES

Bernard Belleau, Ste. Foy, Quebec, Canada

No Drawing. Application September 5, 1957
Serial No. 682,260

14 Claims. (Cl. 260—243)

This invention relates to new chemical compounds which are useful stimulants for the central nervous system and, more particularly, to certain alpha, alpha-diaryl-3-thiamorpholinomethanols and to other compounds, e.g., certain 3-thiamorpholinecarboxylates, which, are useful in the preparation of such stimulants for the central nervous system.

There is provided by the present invention the basic compounds having the formula

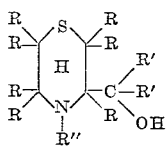

wherein each R and R″ is hydrogen or lower alkyl having one to six carbon atoms inclusive such as methyl, ethyl, propyl, isopropyl, n-butyl, sec.-butyl, isobutyl, n-amyl, n-hexyl, isohexyl, 2-hexyl and the like and each R′ is an aryl or substituted aryl radical such as phenyl, mono- and di-(lower)alkoxyphenyl (e.g. o-, m-, and p-methoxyphenyl and 3,4-dimethoxyphenyl and 3,4-methylenedioxyphenyl), mono- and di-hydroxyphenyl (e.g. o-, m- and p-hydroxyphenyl and 3,4-dihydroxyphenyl), mono- and di-benzyloxyphenyl (e.g. o-, m- and p-benzyloxyphenyl and 3,4-dibenzyloxyphenyl), mono- and di-(lower)alkylphenyl (e.g. o-, m- and p-tolyl and o-, m- and p-ethylphenyl and 3,4-dimethylphenyl), o-, m- and p-nitrophenyl, di(lower)alkylaminophenyl (e.g. o-, m- and p-dimethylaminophenyl and o-, m- and p-diethylaminophenyl), mono- and di-halophenyl (e.g. o-chlorophenyl and p-chlorophenyl and 3,4-dichlorophenyl), thenyl, (lower)alkylthenyl, pyridyl, (lower)alkylpyridyl, furyl and (lower)alkylfuryl, and H signifies that the nitrogen-containing ring is saturated (i.e. is a thiamorpholine ring); and their acid addition salts.

A preferred sub-group of the compounds of the present invention comprises the basic compounds having the formula

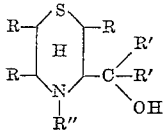

wherein each R is hydrogen, methyl or ethyl and R″ is hydrogen or lower alkyl having one to six carbon atoms inclusive such as methyl, ethyl, propyl, isopropyl, n-butyl, sec.-butyl, isobutyl, n-amyl, n-hexyl, isohexyl, 2-hexyl and the like and each R′ is an aryl or substituted aryl radical such as phenyl, mono- and di(lower)alkoxyphenyl (e.g. o-, m- and p-methoxyphenyl and 3,4-dimethoxyphenyl and 3,4-methylenedioxyphenyl), mono- and di-hydroxyphenyl (e.g. o-, m- and p-hydroxyphenyl and 3,4-dihydroxyphenyl), mono- and di-benzyloxyphenyl (e.g. o-, m- and p-benzyloxyphenyl and 3,4-dibenzyloxyphenyl), mono- and di-(lower)alkylphenyl (e.g. o-, m- and p-tolyl and o-, m- and p-ethylphenyl and 3,4-dimethylphenyl), o-, m- and p-nitrophenyl, di(lower)alkylaminophenyl (e.g. o-, m- and p-dimethylaminophenyl and o-, m- and p-diethylaminophenyl), mono- and di-halophenyl (e.g. o-chlorophenyl and p-chlorophenyl and 3,4-dichlorophenyl), thenyl, (lower)alkylthenyl, pyridyl, (lower)alkylpyridyl, furyl and (lower)alkylfuryl, and H signifies that the nitrogen-containing ring is saturated (i.e. is a thiamorpholine ring); and their acid addition salts.

A more restricted preferred class of the compounds of the present invention comprises the basic compounds having the formula

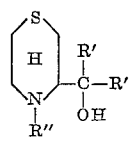

wherein R″ is hydrogen or lower alkyl having one to six carbon atoms inclusive such as methyl, ethyl, propyl, isopropyl, n-butyl, sec.-butyl, isobutyl, n-amyl, n-hexyl, isohexyl, 2-hexyl and the like and each R′ is an aryl or substituted aryl radical such as phenyl, mono- and di-(lower)alkoxyphenyl (e.g. o-, m- and p-methoxyphenyl and 3,4-dimethoxyphenyl and 3,4 - methylenedioxyphenyl), mono- and di-hydroxyphenyl (e.g. o-, m- and p-hydroxyphenyl and 3,4-dihydroxyphenyl), mono- and di-benzyloxyphenyl (e.g. o-, m- and p-benzyloxyphenyl and 3,4-dibenzyloxyphenyl), mono- and di-(lower)alkylphenyl (e.g. o-, m- and p-tolyl and o-, m- and p-ethylphenyl and 3,4-dimethylphenyl), o-, m- and p-nitrophenyl, di(lower)alkylaminophenyl (e.g. o-, m- and p-dimethylaminophenyl and o-, m- and p-diethylaminophenyl), mono- and di-halophenyl (e.g. o-chlorophenyl and p-chlorophenyl and 3,4-dichlorophenyl), thenyl, (lower)alkylthenyl, pyridyl, (lower)alkylpyridyl, furyl and (lower)alkylfuryl, and H signifies that the nitrogen-containing ring is saturated (i.e. is a thiamorpholine ring); and their acid addition salts.

The new compounds are basic and are used per se as the base, especially when it is a crystalline solid at room temperature, and also in the form of addition salts of organic and inorganic acids such as hydrochloric, hydrobromic, hydriodic, sulfuric, nitric, phosphoric, acetic, benzoic, ascorbic, citric, maleic, malic, tartaric, succinic, sulfamic, glyolic, cinnamic and mandelic acids. These salts are prepared by treating the free base with one equivalent of acid and are then isolated if desired, e.g. by lyophilization. The use of a salt is sometimes preferred to increase the aqueous solubility of the compound. Although salts of nontoxic acids must be selected for therapeutic use, water-insoluble but toxic salts are also useful in manufacturing to facilitate recovery from aqueous solutions.

The preparation of the compounds of the present invention involves novel intermediates and processes which may be summarized for clarity by the following reaction scheme for the simplest member of the series which is illustrative only and not to be taken as limiting.

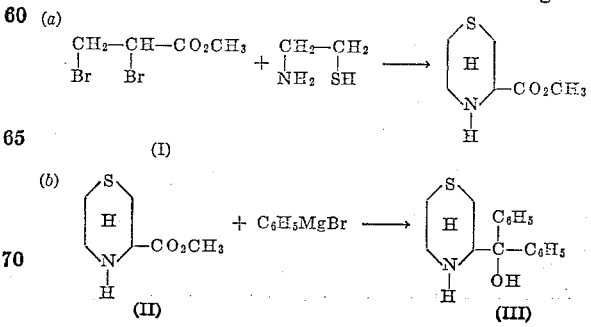

(c) 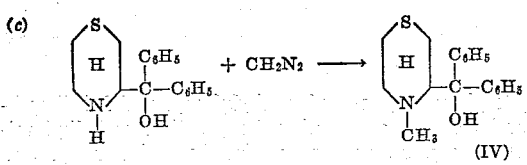
(IV)

In place of methyl 1,2-dibromopropionate (I), use may be made of other esters such as the ethyl ester and of the cheaper dichloropropionates. These compounds are efficiently prepared from acrylic acid esters, e.g. according to Preparation of Organic Intermediates by Shirley.

For the preparation of compounds bearing alkyl substituents on the 2 and 3 carbon atoms of the 3-thiamorpholine carboxylate use is made in the same manner of substituted acrylic acid esters, i.e. those having the formula

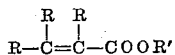

where R is hydrogen or lower alkyl and R' is lower alkyl to produce the compound corresponding to (I) and having the formula

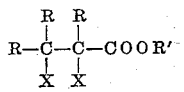

where R is hydrogen or lower alkyl, R' is lower alkyl and X is chloro or bromo.

Reaction of compound I with commercially available mercaptoethylamine, preferably in an inert, i.e. nonhydroxylic, solvent in the cold followed by heating to reflux, or simply between 0° C. and 150° C. and preferably between 40° C. and 80° C., and preferably in the presence of an unreactive, strongly basic tertiary amine bearing no functional groups such as triethylamine, tripropylamine, pyridine, quinoline, dimethylaniline, to neutralize the hydrogen halide produces methyl 3-thiamorpholinecarboxylate (II). There is probably formed as an intermediate which need not be isolated the compound having the structure

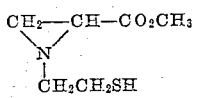

but this is a matter of theory and the process is not dependent thereon or limited thereto. There is thus produced the essential intermediate having the structure

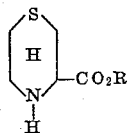 (V)

where R represents lower alkyl.

For the production of compounds bearing alkyl substituents on the 5 and 6 carbon atoms of the 3-thiamorpholinecarboxylate use is made in the same manner of substituted mercaptoethylamines having the formua

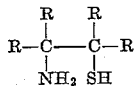

where R is hydrogen or lower alkyl.

The intermediate, e.g. V or II, is then converted to one of the compounds of the present invention, e.g. III, by treatment with an aryl magnesium bromide or iodide under any of the conditions customary for conducting a Grignard reaction, e.g. at from 0° C. to the boiling point in a non-hydroxylic solvent such as dimethyl ether, dibutyl ether, pyridine or tetrahydrofuran. Use is made of at least two moles of a Grignard reagent having the formula R'MgX where X is bromide or iodide and R' is an aryl or substituted aryl radical such as phenyl, mono- and di(lower)alkoxyphenyl (e.g. o-, m- and p-methoxyphenyl and 3,4-dimethoxyphenyl and 3,4-methylenedioxyphenyl), mono- and di-benzyloxyphenyl (e.g. o-, m- and p-benzyloxyphenyl and 3,4-di-benzyloxyphenyl), mono- and di-(lower)alkylphenyl (e.g. o-, m- and p-tolyl and o-, m- and p-ethylphenyl and 3,4-dimethylphenyl), o-, m- and p-nitrophenyl, di(lower)alkylaminophenyl (e.g. o-, m- and p-dimethylaminophenyl and o-, m- and p-diethylaminophenyl), mono- and di-halophenyl (e.g. o-chlorophenyl and p-chlorophenyl and 3,4-dichlorophenyl), thenyl, (lower)alkylthenyl, pyridyl, (lower)alkylpyridyl, furyl and (lower)alkylfuryl. There is thus produced the desired secondary amine such as III. The mono- and di-hydroxylphenyl carbinols are prepared by catalytic debenzylation of the corresponding mono- and di-benzyloxyphenyl carbinols. The corresponding aryl lithium compound, e.g. phenyllithium, may be used in place of the aryl magnesium halide in the usual manner.

The tertiary amines of the present invention are prepared from III by the usual methods, e.g. methylation with diazomethane or formic acid and formaldehyde, ethylation and butylation by di-ethyl sulfate and di-butyl sulfate respectively.

Further information is supplied by the following examples which are provided for purposes of information only and are not to be construed as limiting the invention.

EXAMPLE 1

*Methyl 3-thiamorpholinecarboxylate*

In a two-liter three-neck flask was placed 108 g. (0.44 mole) methyl 1,2-dibromopropionate, 150 ml. redistilled tetrahydrofuran and 150 ml. benzene. The flask was cooled in ice-water and then with stirring a warm solution of 34 g. (0.44 mole) mercaptoethylamine, 88 g. triethylamine, 100 ml. tetrahydrofuran and 100 ml. benzene was added over 30 minutes. The mixture was stirred for two hours and then heated under reflux for two hours. After cooling, triethylamine hydrobromide was removed by filtration. The filtrate was distilled in vacuo to give at least 30 g. colorless liquid methyl 3-thiamorpholinecarboxylate, B.P. 126°–127° C./16 mm.

The same product is prepared by substituting an equimolar quantity of methyl 1,2-dichloropropionate for the methyl 1,2-dibromopropionate.

EXAMPLE 2

*α-(3-thiamorpholinyl)-benzhydrol*

To a solution of phenylmagnesium bromide prepared from 4.17 g. magnesium turnings and 28 g. (0.178 mole) bromobenzene in 150 ml. dry diethyl ether there was added 7.0 g. (0.048 mole) of methyl 3-thiamorpholinecarboxylate in 25 ml. ether. The mixture was stirred at reflux temperature for 15 hours and then decomposed by addition of 10% aqueous ammonium chloride. Upon extraction with 200 ml. chloroform, the organic phase was separated, dried and evaporated to yield solid α-(3-thiamorpholinyl)-benzhydrol.

This product was dissolved in chloroform and treated at 0° C. with gaseous hydrogen chloride. After dilution with ether, the α-(3-thiamorpholyinyl)-benzhydrol hydrochloride precipitated and was collected by filtration, recrystallized from ethanol-acetone and found to weigh at least 6 g. and to melt at 248°–250° C. with decomposition.

EXAMPLE 3

The procedure of Example 1 is followed except that the methyl 1,2-dibromopropionate is replaced by an equimolar weight of methyl 1,2-dibromobutyrate, methyl 1,2-dibromohexanoate, methyl 1,2-dibromononanoate, methyl 1,2-dibromo-1-methylpropionate, methyl 1,2-dibromo-1-methylbutyrate, methyl 1,2-dibromoethylpropionate, methyl 1,2-dibromo-1-ethylvalerate, methyl 1,2-dibromoisovalerate, methyl 1,2-dibromo-1-methylisovalerate, methyl 1,2-dibromo-2-methylvalerate, and methyl 1,2-dibromo-1,2-dimethylvalerate respectively to produce methyl 2-methyl-3-thiamorpholinecarboxylate, methyl 2-n-propyl-3-thiamorpholinecarboxylate, methyl 2-n-hexyl-3-thiamorpholinecarboxylate, methyl-3-thiamorpholinecarboxylate, methyl 2,3-dimethyl-3-thiamorpholinecarboxylate, methyl 3-ethyl-3-thiamorhpolinecarboxylate, methyl 2,3-diethyl-3-thiamorpholinecarboxylate, methyl 2,2-dimethyl-3-thiamorpholinecarboxylate, methyl 2,2,3-trimethyl - 3 - thiamorpholinecarboxylate, methyl 2-ethyl-2-methyl-3-thiamorpholinecarboxylate, and methyl 2-ethyl-2,3-dimethyl-3-thiamorpholinecarboxylate respectively. These esters are converted by the general procedures set forth above and illustrated specifically in Example 2 into substituted thiamorpholinyldiaryl carbinols which alter the function of the central nervous system, e.g. act as stimulants.

EXAMPLE 4

The procedure of Example 2 is followed except that the methyl 3-thiamorpholinecarboxylate used therein is replaced in turn by an equimolar weight of each of the alkylated esters prepared in Example 3 to produce the solid compounds α-(2-methyl-3-thiamorpholinyl)-benzhydrol, α-(2-n-propyl-3-thiamorpholinyl)-benzhydrol, α-(2-n-hexyl-3-thiamorpholinyl)-benzhydrol, α-(3-methyl-3-thiamorpholinyl)-benzhydrol, α-(2,3-dimethyl-3-thiamorpholinyl)-benzhydrol, α-(3-ethyl-3-thiamorpholinyl)-benzhydrol, α-(2,3-di-ethyl - 3 - thiamorpholinyl)-benzhydrol, α-(2,2-dimethyl - 3 - thiamorpholinyl)-benzhydrol, α-(2,2,3-trimethyl-3-thiamorpholinyl)-benzhydrol, α-(2-ethyl-2-methyl - 3 - thiamorpholinyl)-benzhydrol, and α-(2-ethyl-2,3-dimethyl-3-thiamorpholinyl)-benzhydrol respectively. These free bases per se or after conversion as set forth above to acid addition salts exhibit useful alteration of the function of the central nervous system, e.g. stimulation.

EXAMPLE 5

The procedure of Example 1 is followed except that the 2-mercaptoethylamine is replaced in turn by an equimolar quantity of 2-methyl-2-mercaptoethylamine, 1-methyl-2-mercaptoethylamine, 1,1,2,2-tetramethyl-2-mercaptoethylamine, 1-ethyl-2-mercaptoethylamine, 2-ethyl-2-mercaptoethylamine, 1-hexyl-2-mercaptoethylamine, 2-hexyl-2-mercaptoethylamine, 1-isopropyl-2-mercaptoethylamine, and 1,1,2-trimethyl-2-mercaptoethylamine respectively to produce methyl 6-methyl-3-thiamorpholinecarboxylate, methyl 5-methyl-3-thiamorpholinecarboxylate, methyl 5,5,6,6 - tetramethyl - 3 - thiamorpholinecarboxylate, methyl 5-ethyl-3-thiamorpholinecarboxylate, methyl 6-ethyl-3-thiamorpholinecarboxylate, methyl 5-hexyl-3-thiamorpholinecarboxylate, methyl 6-hexyl-3-thiamorpholinecarboxylate, methyl 5-isopropyl-3-thiamorpholinecarboxylate, and methyl 5,5,6-trimethyl-3-thiamorpholinecarboxylate respectively. These esters are converted by the procedures set forth herein, e.g. as illustrated in Example 2, into substituted thiamorpholinyl-diaryl carbinols which alter the function of the central nervous system, e.g. produce stimulation or hyperactivity.

EXAMPLE 6

The procedure of Example 2 is followed except that the methyl 3-thiamorpholinecarboxylate used therein is replaced in turn by each of the alkylated esters prepared in Example 5 to produce the solid compounds α-(6-methyl-3-thiamorpholinyl))-benzhydrol, α-(5-methyl-3-thiamorpholinyl))-benzhydrol, α-(5,5,6,6-tetramethyl - 3 - thiamorpholinyl)-benzhydrol, α-(5-ethyl-3-thiamorpholinyl))-benzhydrol, α-(6-ethyl-3-thiamorpholinyl))-benzhydrol, α-(5-hexyl-3-thiamorpholinyl))-benzhydrol, α-(6-hexyl-3-thiamorpholinyl))-benzhydrol, α-(5-isopropyl-3-thiamorpholinyl))-benzhydrol, and α-(5,5,6-trimethyl-3-thiamorpholinyl))-benzhydrol respectively as free bases which per se or after conversion to acid addition salts in the usual manner display marked ability to alter the function of the central nervous system, as by stimulation.

EXAMPLE 7

Methyl 3-thiamorpholinecarboxylates bearing lower alkyl substituents on one or both of the 2 and 3 carbon atoms as well as on one or both of the 5 and 6 carbon atoms are prepared by using in turn in the procedure of Example 1 an equimolar quantity of each of the 1,2-dibromoalkanoates of Example 3 in place of methyl 1,2-dibromopropionate to react in turn with an equimolar quantity of each of the substituted mercaptoethylamines of Example 5. The esters so produced are converted by the procedures set forth herein into substituted thiamorpholinyl-diaryl carbinols which alter the function of the central nervous system, e.g. produce stimulation.

EXAMPLE 8

α-(3-thiamorpholinyl)-benzhydrols bearing lower alkyl substituents on one or both of the 2 and 3 carbon atoms as well as on one or both of the 5 and 6 carbon atoms are prepared by using in turn in the procedure of Example 2 an equimolar quantity of each of the methyl 3-thiamorpholinecarboxylates of Example 7 in place of the methyl 3-thiamorpholinecarboxylate used therein. These solid free bases, per se and after conversion to acid addition salts in the usual manner, display marked ability to alter the function of the central nervous system as by stimulation.

EXAMPLE 9

The procedure of Example 2 is followed except that the bromobenzene used therein is replaced in turn by an equimolar quantity of o-methoxy-bromobenzene, m-methoxy-bromobenzene, p-methoxy-bromobenzene, 3,4-dimethoxy - bromobenzene, 3,4 - methylene - dioxy-bromobenzene, o-benzyloxy-bromobenzene, 4-benzyloxy-bromobenzene, p - benzyloxy - bromobenzene, o - methyl-bromobenzene, m - methyl - bromobenzene, p - methyl-bromobenzene, o-benzyloxy-bromobenzene, m-benzyloxybenzene, p-ethyl-bromobenzene, 3,4-dimethyl-bromobenzene, o-dimethylamino-bromobenzene, m-dimethylamino-bromobenzene, p-dimethylamino-bromobenzene, o - diethylamino - bromobenzene, m - diethylamino-bromobenzene, p-diethylamino-bromobenzene, o-chloro-bromobenzene, p-chloro-bromobenzene, 2-bromothiophene, 3 - methyl - 2 - bromothiophene, 3 - bromothiophene, 2 - methyl - 3 - bromothiophene, 2 - bromopyridine, 3 - bromopyridine, 4 - bromopyridine, 2 - methyl - 4 - bromopyridine, 4 - methyl - 2 - bromopyridine, 2 - bromofuran, 3 - bromofuran and 2 - methyl - 3 - bromofuran respective to produce 3-thiamorpholinyl-di-o-methoxy-phenyl carbinol, 3-thiamorpholyinyl-di-m-methoxy-phenyl carbinol, 3-thiamorpholinyl-di-p-methoxy-phenyl carbinol, 3-thiamorpholinyl-di-3,4-dimethoxy-phenyl carbinol, 3-thiamorpholinyl-di-3,4-methylene-dioxy-phenyl carbinol, 3-thiamorpholinyl-di-o-benzyloxy-phenyl carbinol, 3 - thiamorpholinyl - di - m - benzyloxy-phenyl carbinol, 3-thiamorpholinyl-di-p-benzyloxy-phenyl carbinol, 3-thiamorpholinyl-di-o-methyl-phenyl carbinol, 3-thiamorpholinyl-di-m-methyl-phenyl carbinol, 3-thiamorpholinyl-di-p-methyl-phenyl carbinol, 3-thiamorpholinyl-di-o-ethyl-phenyl carbinol, 3-thiamorpholinyl-di-m-ethyl-phenyl carbinol, 3-thiamorpholinyl-di-p-ethyl-phenyl carbinol, 3-thiamorpholinyl-di-3,4-dimethyl-phenyl carbinol, 3-thiamorpholinyl-di-o-dimethylamino-phenyl carbinol, 3-thiamorpholinyl-di-m-dimethylamino-phenyl carbinol, 3-thiamorpholinyl-di-p-dimethylamino-phenyl carbinol, 3 - thiamorpholinyl - di - o - diethylamino-phenyl carbinol, 3-thiamorpholinyl-di-m-diethylamino-phenyl carbinol, 3-thiamorpholinyl-di-p-diethylamino-phenyl carbinol, 3-thiamorpholinyl-di-o-chloro-phenyl carbinol, 3-thiamorpholinyl-di-p-chloro-phenyl carbinol, 3 - thiamorpholinyl - di - 2 - thenyl carbinol, 3 - thiamorpholinyl-di-3-methyl-2-thenyl carbinol, 3-diamorpholinyl-di-3-thenyl carbinol, 3-thiamorpholinyl-di-2-methyl-3-thenyl carbinol, 3-thiamorpholinyl-di-2-pyridyl carbinol, 3 - thiamorpholinyl - di - 3 - pyridyl carbinol, 3 - thiamorpholinyl-di-4-pyridyl carbinol, 3-thiamorpholinyl-di-2-methyl-4-pyridyl carbinol, 3-thiamorpholinyl-di-4-methyl-2-pyridyl carbinol, 3-thiamorpholinyl-di-2-furyl carbinol, 3-thiamorpholinyl-di-3-furyl carbinol, and 3-thiamorpholinyl-di-2-methyl-3-furyl carbinol respectively. These free bases per se or after conversion as set forth above to acid addition salts exhibit useful alteration of the function of the central nervous system, e.g. stimulation.

EXAMPLE 10

The procedure of each experiment given under Example 9 is repeated except that the methyl 3-thiamorpholinecarboxylate used therein is replaced in turn by an equimolar weight of each of the substituted esters prepared according to Examples 3, 5 and 7 to produce compounds active on the central nervous system which are homologous with those of Example 9, i.e. bear alkyl substituents on one or more of the 2, 3, 5 and 6 carbon atoms of the thiamorpholine ring.

EXAMPLE 11

The procedures of Examples 2, 4, 6, 8 and 9 are followed to produce the same products except that the aryl-magnesium halide used therein is replaced by an equimolar amount of the corresponding aryllithium.

EXAMPLE 12

The N-methyl, N-ethyl and N-n-hexyl derivatives of the secondary amines prepared in Examples 2, 4, 6, 8 and 9 are prepared by dissolving the latter (0.1 mole) in an organic solvent containing no active hydrogen, e.g. benzene, chloroform, dimethyl formamide and diethyl ether, adding a solution of 0.1 mole of diazomethane, diazoethane and diazo-n-hexane respectively, allowing the mixture to stand for thirty minutes and then removing the solvent, e.g. by lyophilization or by distillation at moderate vacuum on the steam bath to leave the desired tertiary amine as the residue. These amines, which are strong bases, are then converted to acid addition salts by treatment with one equivalent of acid.

EXAMPLE 13

The procedures of Examples 1, 3 and 7 are carried out using in turn an equimolar amount of the corresponding ethyl, n-propyl and n-hexyl ester of the 1,2-dihaloalkanoate in place of the methyl ester to produce corresponding ethyl, n-propyl and n-hexyl 3-thiamorpholinecarboxylates, respectively. These in turn are used in the procedures of Examples 2, 4, 5, 6, 8, 9, 10 and 11 to replace in equimolar quantity the methyl esters therein and thus produce the same carbinols.

EXAMPLE 14

A warm solution of 69 g. of 2-mercaptoethylamine and 180 g. of triethylamine in 500 ml. of chloroform was added portionwise as rapidly as possible to a stirred solution of 234 g. of ethyl 2,3-dibromopropionate in 800 ml. of a 5:3 mixture of benzene and chloroform. The rate of the addition was such that vigorous reflux of the solvent was maintained. Alternately, but less satisfactorily, the addition can be carried out at a lower temperature with the aid of a cooling mixture. After the addition was completed, the mixture was stirred several hours (5 to 20 hours) at room temperature, then the precipitated salts removed by filtration. The filtrate was concentrated in vacuo and the residue purified by distillation in vacuo. In this manner, from 80 to 100 g. of colorless ethyl 1,4-thiamorpholine-3-carboxylate, B.P. 114–118°/7–8 mm. was obtained.

Calcd. for $C_7H_{13}O_2SN$: S, 18.2; N, 8.00. Found: S, 18.3; N, 7.91.

In this preparation, esters of 2,3-dichloropropionate as well as 2,3-dibromo or 2,3-dichlorobutyrate or any other 2,3-dihaloaliphatic ester can be substituted for ethyl 2,3-dibromopropionate. The 2-mercapto-ethylamine can also be substituted by any other vicinal amino thiol and the tertiary amine component can be varied considerably without affecting the general course of the reaction.

*α-(3-thiamorpholinyl)-benzhydrol.*—An example of the use of 1,4-thiamorpholine-3-carboxylic esters as starting material for the preparation of a therapeutically useful compound is described. Thus, a solution of phenylmagnesium bromide in 1500 ml. of dry ether was prepared from 283 g. of bromobenzene and 43 g. of magnesium turnings. While stirring and cooling, a solution of 90 g. of ethyl 1,4-thiamorpholine-3-carboxylate in 100 ml. of dry ether was added dropwise over one to two hours. The mixture was heated under reflux for 15 hours, cooled in ice and carefully decomposed with a solution of 250 g. of ammonium chloride in one liter of water. The mixture was stirred vigorously until all of the deposited gum was decomposed. The precipitated solids were removed by filtration and saved. The organic phase of the filtrate was separated, dried and evaporated to yield a crystalline residue. All solids were combined, dissolved in warm chloroform, the solution washed with dilute aqueous ammonium chloride, then dried and concentrated in vacuo to incipient crystallization. One volume of ether was added, the mixture chilled and the crystals collected. The product was pure, has M.P. 164°–165° C. and the yield amounted to 87 g. (or 60% of the theoretical). The product was recrystallized from chloroform-ether before analysis.

Calcd. for $C_{17}H_{19}ONS$: N, 4.91; S, 11.2. Found: N, 5.04; S, 11.0.

The crystalline free base may be converted to a crystalline water soluble salt with a mineral or organic acid. As an example, it was converted to a crystalline hydrochloride as follows: 50 g. of the crystalline free base was dissolved in the minimum volume of warm chloroform and while cooling under the water, the solution treated with a methanolic solution of hydrogen chloride (5% excess). The solution was chilled and the colorless crystalline hydrochloride collected. The yield was virtually quantitative and the product had M.P. 248°–250° C. (decomp.).

Calcd. for $C_{17}H_{20}ONCIS$: N, 4.35; Cl, 11.0. Found: N, 4.48; Cl, 11.0.

*Resolution into optical enantiomers of the racemic α-(2-thiamorpholinyl)-benzhydrol.*—Resolution of the racemic base can be accomplished by treatment of the latter in a suitable solvent with an optically active acid. The separated crystalline salts thus obtained can be decomposed by treatment with either a mineral acid or a base and the optically pure thiamorpholine derivative recovered. As an example, the use of dibenzoyltartaric acid as the resolving agent is described. Thus, a solution of 18.3 g. of α-(2-thiamorpholinyl)-benzhydrol in a minimum volume of hot chloroform was treated with 23 g. of dibenzoyltartaric acid. The solvent was evaporated in vacuo and the residue digested with 200 ml. of acetone until crystallization began. The mixture was refrigerated for 24 hours and the white crystalline mass collected: yield, 11 g. An analytical sample of this dibenzoyltartrate salt was obtained after three recrystallizations from acetone; it forms fine colorless needles, M.P. 154–156° C.

Calcd. for $C_{35}H_{33}O_9NS$: N, 2.17; S, 4.97. Found: N, 2.02; S, 4.83.

The eleven grams of crystalline salt was decomposed by shaking the solid with a mixture of chloroform and aqueous sodium hydroxide until no solid particles were visible. The chloroform was dried and evaporated to yield 5.30 g. of colorless rods, M.P. 95–96° C. An analytical sample was obtained by recrystallization from hexane and had M.P. 97–98° C. Its rotation was measured in chloroform: $\alpha = -3.00°$; $[\alpha]_D^{22} = 75°$ C. (C=2).

Calcd. for $C_{17}H_{19}ONS$: N, 4.91; S, 11.2. Found: N, 5.04; S, 11.4.

The mother liquor from the acetone filtrate above was concentrated in vacuo and some more crystalline material removed by filtration. The filtrate was diluted with isopropyl alcohol whereupon crystallization occurred. The solid was collected and saved. The filtrate was refrigerated for 24 hours and more crystalline material collected and combined with the preceding crop. The solid was recrystallized from isopropyl alcohol to give colorless needles M.P. 135–140° C. Yield: 17 g. This dibenzoyltartrate which was enriched in the dextro isomer was decomposed with aqueous base as in the case of the levo-isomer. This gave a crystalline mass which was digested with boiling hexane and filtered hot. The hexane insoluble material was racemic α-(2-thiamorpholinyl)-benzhydrol. On cooling, the filtrate deposited 3.0 g. of crystals, M.P. 96–98° C. An analytical sample of this material was obtained by recrystallization from hexane; it formed colorless rods, M.P. 97–98° C. Its rotation was measured in chloroform; $\alpha = +3.00°$: $[\alpha]_D^{23} = +75°$ (C=2).

Calcd. for $C_{17}H_{19}ONS$: N, 4.91; S, 11.2. Found: N, 4.97; S, 11.3.

An equimolar mixture of this dextro rotatory isomer and the levo rotatory one had M.P. 164–165° C. undepressed by further admixture with racemic α-(2-thiamorpholinyl)-benzhydrol of M.P. 164–165° C.

Both optical isomers were converted to their corresponding hydrochlorides as described above in the case of the racemic compound. They both melted with decomposition at 245° C.

The compounds of the present invention are useful clinically in the treatment of depressed states and for inhibition of the appetite of obese patients.

I claim:

1. A member selected from the group consisting of a base having the formula

[structure: thiamorpholine ring with R substituents, H, and C(R')(R')OH group]

wherein each R and R″ is a member selected from the group consisting of hydrogen and lower alkyl having one to six carbon atoms inclusive and each R′ is a member selected from the group consisting of phenyl, mono- and di(lower)alkoxyphenyl, mono- and di-hydroxyphenyl, mono- and di-benzyloxyphenyl, mono- and di-(lower)-alkylphenyl, o-, m- and p-nitrophenyl, di(lower)alkylaminophenyl, mono- and di-halophenyl, thenyl, (lower)-alkylthenyl, pyridyl, (lower)alkylpyridyl, furyl and (lower)alkylfuryl, and H signifies that the nitrogen-containing ring is saturated; and acid addition salts thereof.

2. α-(3-thiamorpholinyl)-benzhydrol.
3. α-(3-thiamorpholinyl)-di-p-methoxyphenyl carbinol.
4. α-(3-thiamorpholinyl)-di-p-chlorophenyl carbinol.
5. α-(3-thiamorpholinyl)-di-p-tolyl carbinol.
6. α-(3-thiamorpholinyl)-di-2-thenyl carbinol.
7. A member selected from the group consisting of an ester having the formula

[structure: thiamorpholine ring with R substituents, H, and C(=O)OR' group]

wherein each R is a member selected from the group consisting of hydrogen and lower alkyl and R' represents lower alkyl, and H signifies that the ring is saturated; and acid addition salts thereof.

8. Methyl 3-thiamorpholinecarboxylate.
9. Methyl 2-methyl-3-thiamorpholinecarboxylate.
10. Methyl 3-methyl-3-thiamorpholinecarboxylate.
11. Methyl 2,3-dimethyl-3-thiamorpholinecarboxylate.
12. Methyl 6-methyl-3-thiamorpholinecarboxylate.
13. The process for the production of an ester having the formula

[structure: thiamorpholine ring with R substituents, H, and C(=O)OR' group]

wherein each R represents a member selected from the group consisting of hydrogen and lower alkyl and R' represents lower alkyl and H signifies that the ring is saturated which comprises reacting an ester having the formula $$R-\underset{\underset{X}{|}}{\overset{\overset{R}{|}}{C}}-\underset{\underset{X}{|}}{\overset{\overset{R}{|}}{C}}-\overset{\overset{O}{\|}}{C}-OR'$$

wherein each R represents a member selected from the group consisting of hydrogen and lower alkyl, R' represents lower alkyl and X represents a member selected from the group consisting of chloro and bromo with about one equivalent of an amine having the formula $$R-\underset{\underset{NH_2}{|}}{\overset{\overset{R}{|}}{C}}-\underset{\underset{SH}{\diagdown}}{\overset{\overset{R}{|}}{C}}-R$$

wherein each R represents a member selected from the group consisting of hydrogen and lower alkyl in a nonhydroxylic solvent at between 0° and 150° C.

14. The process for the production of an ester having the formula

[structure: thiamorpholine ring with R substituents, H, and C(=O)OR' group]

wherein each R represents a member selected from the group consisting of hydrogen and lower alkyl and R' represents lower alkyl and H signifies that the ring is saturated which comprises reacting an ester having the formula $$R-\underset{\underset{X}{|}}{\overset{\overset{R}{|}}{C}}-\underset{\underset{X}{|}}{\overset{\overset{R}{|}}{C}}-\overset{\overset{O}{\|}}{C}-OR'$$

wherein each R represents a member selected from the group consisting of hydrogen and lower alkyl, R' represents lower alkyl and X represents a member selected from the group consisting of chloro and bromo with about one equivalent of an amine having the formula $$R-\underset{\underset{NH_2}{|}}{\overset{\overset{R}{|}}{C}}-\underset{\underset{SH}{\diagdown}}{\overset{\overset{R}{|}}{C}}-R$$

wherein each R represents a member selected from the group consisting of hydrogen and lower alkyl in a nonhydroxylic solvent at between 0° and 150° C. in the presence of a strongly basic tertiary amine bearing no functional groups.

References Cited in the file of this patent

UNITED STATES PATENTS

| | | |
|---|---|---|
| 2,191,452 | Coghill | Feb. 27, 1940 |
| 2,283,186 | Coghill | May 19, 1942 |